Nov. 11, 1952     R. L. ANDERSON     2,617,518
CROP-DISTRIBUTING DEVICE FOR HARVESTERS
Filed March 1, 1950     3 Sheets-Sheet 1
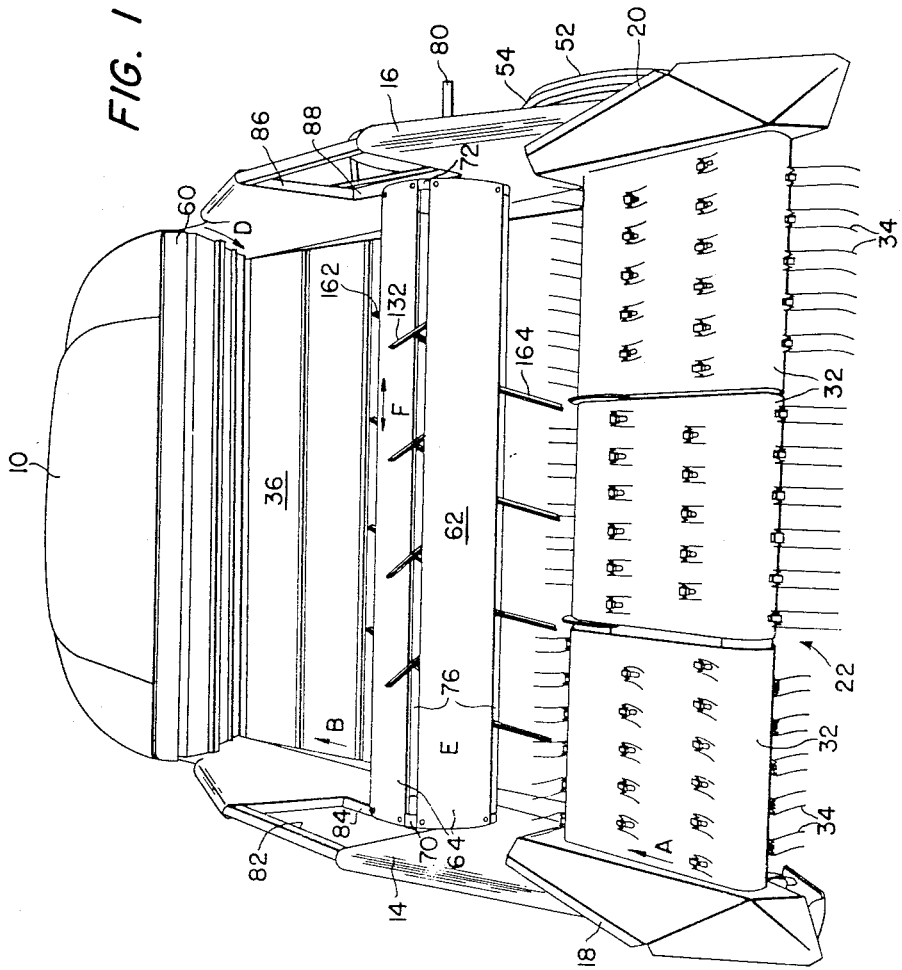
INVENTOR.
R. L. ANDERSON
ATTORNEYS

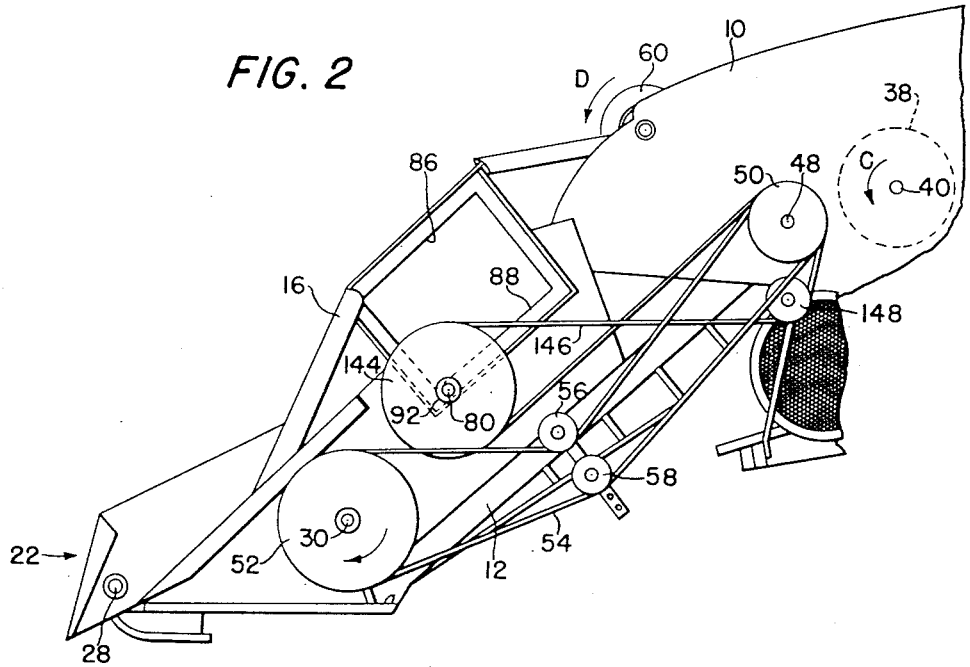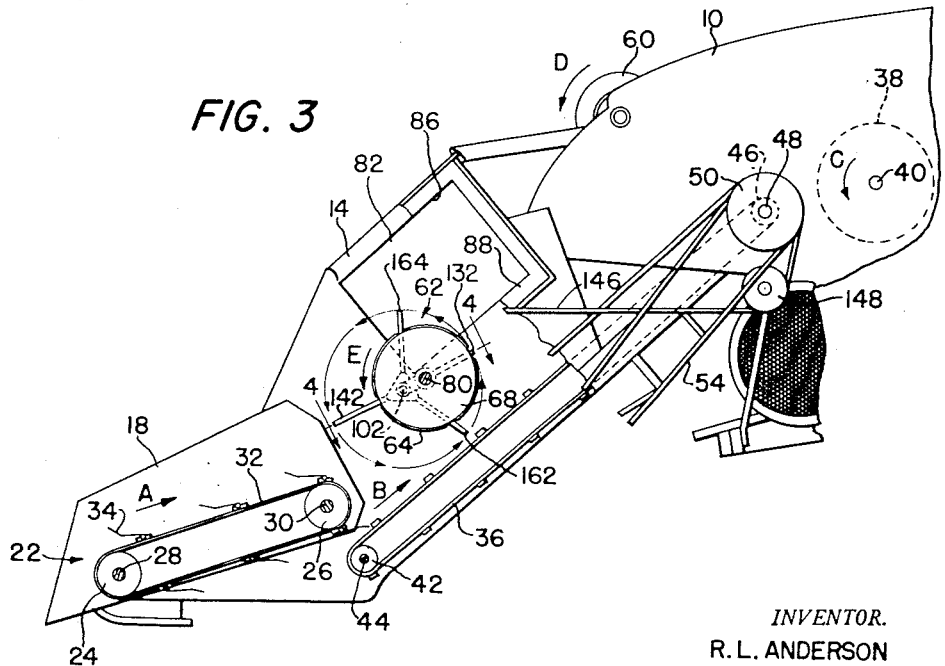

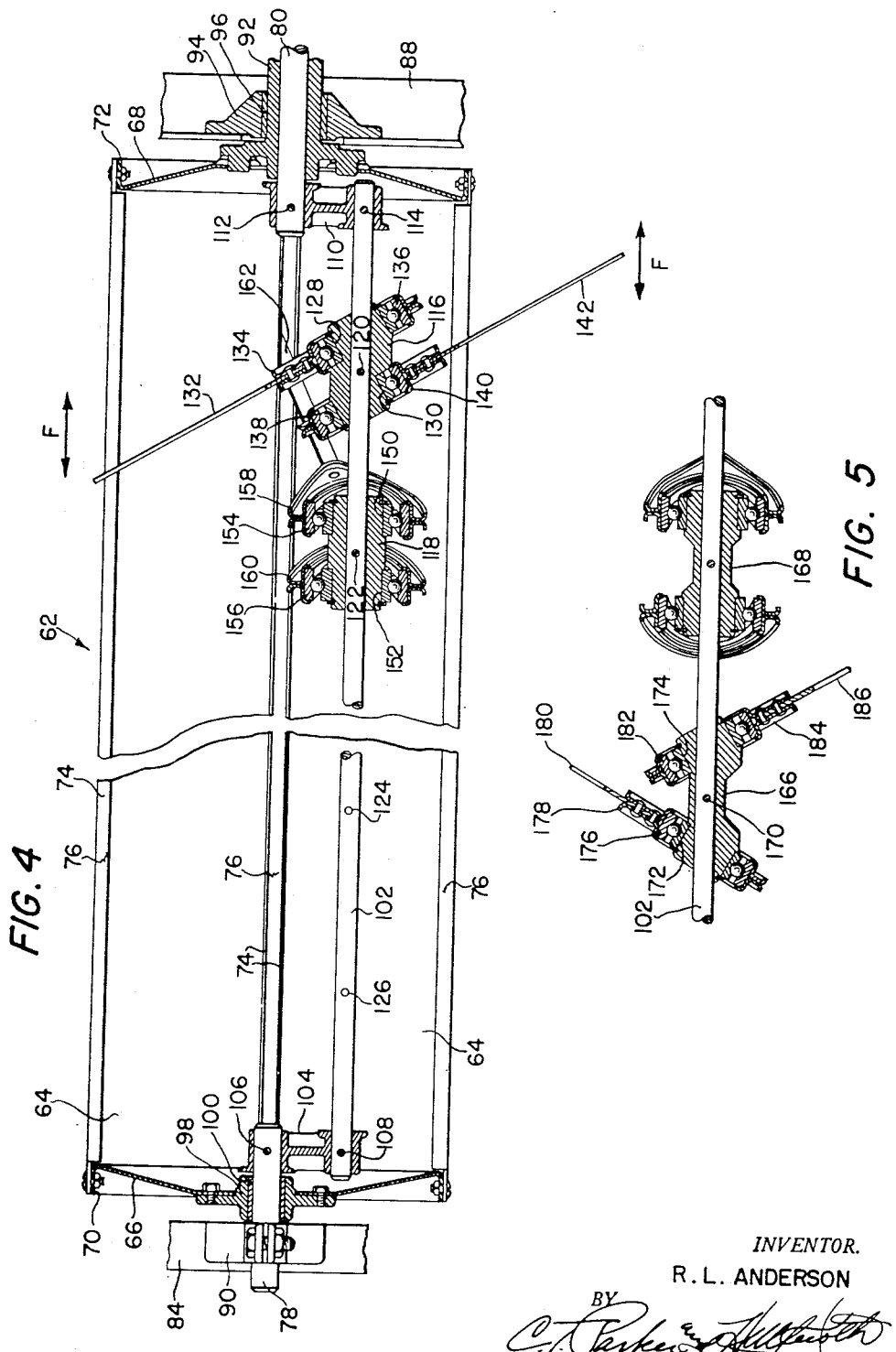

Patented Nov. 11, 1952

2,617,518

UNITED STATES PATENT OFFICE 2,617,518

CROP-DISTRIBUTING DEVICE FOR HARVESTERS

Ralph L. Anderson, East Moline, Ill., assignor to Deere & Company, Moline, Ill., a corporation of Illinois Application March 1, 1950, Serial No. 147,065

12 Claims. (Cl. 198—167)

This invention relates to a crop-spreading device for use on harvesters, particularly for use on harvesters of the pick-up-thresher type.

In some localities and under some conditions standing grain is normally harvested by a harvester of the combine type which operates to cut the grain and immediately thereafter to thresh the grain, the cutting and threshing mechanisms being component parts of the same machine. In other localities or in other conditions, it is sometimes desirable to cut the grain and lay it in a windrow or swath on the stubble in the field, where it is allowed to cure or dry for a selected period before the threshing operation is performed. Subsequently the windrowed grain is picked up by a machine that may be very similar to the conventional combine except that the cutting mechanism has been replaced with pick-up mechanism for gathering the windrowed grain and for delivering this grain to threshing mechanism.

When grain is harvested and then immediately threshed, there is no particular problem with respect to spreading the grain out before entry thereof into the threshing mechanism. However, when the grain has been windrowed, the windrows are relatively narrow as compared to the width of the pick-up means, which results in the feeding of the grain in a relatively narrow but thick stream to the threshing mechanism, whereas the threshing mechanism, particularly the rack and shoe, is designed to operate more efficiently when handling a wider but thinner stream. It is therefore desirable to provide means between the pick-up means and the threshing mechanism for disintegrating the picked up windrow and for spreading it transversely so that it is fed to the mechanism in a wider and thinner stream. Such mechanisms are known generally as windrow spreaders and various forms thereof have been heretofore used with different degrees of success.

The principal object of the present invention is to provide an improved windrow distributor or spreader of the general character referred to but which is improved to the extent that increased economy and efficiency are obtained. Specifically, this device comprises an elongated hollow structure or drum having a cylindrical peripheral wall provided with a plurality of lengthwise, circumferentially spaced slits through which crop-engaging fingers project. Mechanism within the drum functions upon rotation of the drum to extend and retract the fingers. This mechanism further serves to shift the outer or crop-engaging ends of the fingers lengthwise of the drum or crosswise of the conveyor over which the picked up grain is fed so that the grain is agitated and spread into a wider and thinner stream.

Further features of the invention reside in improvements in the mechanism for effecting oscillation and rotation of the crop-engaging fingers. A still further object resides in the designing of the spreading means so that it may be readily utilized as an attachment to existing machines of at least one well known type.

The foregoing and other important objects and desirable features inherent in and encompassed by the invention will become apparent to those versed in the art as two preferred embodiments of the invention are fully disclosed in the following detailed description and accompanying sheets of drawings in which:

Figure 1 is a perspective view of the foward portion of a combine equipped with a representative form of the spreading device;

Figure 2 is a side elevational view of the forward portion of the combine, the view being taken from the left-hand side of the machine;

Figure 3 is a longitudinal sectional view similar to that in Figure 2 but with the left-hand side sheet removed to expose the interior mechanism;

Figure 4 is a transverse sectional view, on an enlarged scale, taken substantially along the line 4—4 of Figure 3; and Figure 5 is a fragmentary sectional view showing a modified form of the crop-engaging fingers and mounting thereof.

The harvesting machine chosen for the purposes of orienting the invention is of a well-known type and will be described only generally, familiarity with the details of machines of this type being assumed. This machine has a generally longitudinally extending thresher body or housing 10 ahead of which is located a longitudinally alined feed conveyor frame 12. This frame is delineated at its right- and left-hand sides by side sheet structures 14 and 16, respectively, the forward parts of which merge respectively into longitudinally extending divider shields 18 and 20 which in turn delineate opposite sides of a relatively wide pick-up mechanism designated generally by the numeral 22. The pick-up mechanism comprises front and rear transverse rollers 24 and 26 mounted respectively on transverse shafts 28 and 30. A plurality of endless belts 32 are arranged side by side and trained about the rollers 24 and 26. These belts include a plurality of pick-up fingers 34 which function to pick up windrowed grain from the stubble and to deliver this grain rearwardly to the upwardly and rearwardly moving upper run of a feeder conveyor 36 carried by the feeder frame structure 12 behind the pick-up mechanism 22. The direction of movement of the pick-up conveyors or belts is indicated by the arrow A in Figure 3. The direction of movement of the upper run of the feeder conveyor 36 is designated in the same figure by the arrow B. The grain is carried upwardly and rearwardly by the feeder conveyor 36 and is delivered to a threshing cylinder 38 in the thresher housing 10. This cylinder rotates on a shaft 40 in the direction of the arrow C in Figures 2 and 3. The details of the cylinder and its relationship to other threshing parts have been omitted, since these details form no part of the present invention. The general arrangement illustrated is typically shown in the U. S. patent to Anderson, 2,402,007.

The lower end of the feeder conveyor 36 is trained about a roller 42 carried on a transverse shaft 44 and the upper end is carried on a roller 46 (dotted lines in Figure 3) mounted on a transverse shaft 48. This shaft is suitably driven from means at the other side of the machine for rotation in such direction as to drive the feeder conveyor for travel in the direction of the arrow B (Figure 3). The shaft 48 further serves as a driving shaft for driving the pick-up mechanism 22. This shaft has keyed thereto a sheave 50 in longitudinal alinement with a relatively larger sheave 52 keyed to the pick-up mechanism shaft 30 outside the left-hand divider shield 20. An endless belt 54 is trained about the sheaves 50 and 52 and about a pair of adjustable idler sheaves 56 and 58. The cylinder 38 may be driven by any suitable means (not shown).

The mechanism thus far described operates in such manner that the pick-up mechanism 22 picks up windrowed grain and moves it rearwardly in the direction of the arrow A for deposit on the upper run of the feeder conveyor 36. The feeder conveyor moves the grain upwardly in the direction of the arrow B for delivery to the threshing cylinder 38. An auxiliary upper feeder conveyor 60 is provided for the purpose of cooperating with the upper end of the feeder conveyor 36 in effecting delivery of grain to the threshing cylinder. This auxiliary feeder operates so that its forward run travels in the direction of the arrow D in Figures 1, 2 and 3.

The spreader is designated in its entirety by the numeral 62. The position thereof with respect to the pick-up mechanism 22 and feeder 36 is best shown in Figures 1 and 3. The spreader is in the form of an elongated drum made up of an elongated hollow structure comprising a plurality of preferably arcuate sections 64 assembled about a common axis so that the assembled sections provide a continuous, cylindrical peripheral wall. It will be obvious, of course, that the sections 64 could be of different shape so that the drum would be, say, oval, square, etc., in cross-section. However, for the purposes of brevity and convenience, the cylindrical drum will be described, although the word "cylindrical" should be taken to include other shapes such as those suggested above.

The hollow drum structure thus formed is provided at opposite ends with end supporting elements 66 and 68 respectively having annular flanges 70 and 72 to which opposite end portions of the arcuate sections are rigidly but removably secured. Each arcuate section 64 has its lengthwise edges turned down to provide longitudinal radially inwardly extending flanges 74. The edge or flange 74 of each section is spaced circumferentially from the proximate edge of a neighboring section and the spaces between proximate edges provide a plurality of lengthwise openings or slits 76 in the peripheral wall of the drum structure. In the present case, there are four such slits, spaced angularly 90° apart so that there are two pairs of slits, the slits in each pair being diametrically opposed.

The drum structure is supported at its opposite ends by a pair of short supporting shafts, these comprising a right-hand supporting shaft 78 and a left-hand supporting shaft 80. (Throughout the description, the expressions "right-hand" and "left-hand" are used with respect to an observer standing behind the machine and looking forwardly.) The right-hand side sheet 14 is provided with a rectangular opening 82 which has along its lower edge an outwardly turned supporting flange 84. The left-hand side sheet 16 is provided with a similar and alined opening 86 along the bottom edge of which is a supporting flange 88. The right-hand flange 84 is provided with a supporting clamp 90 which fixedly mounts the short supporting shaft 78 and thus holds this shaft against rotation. The left-hand shaft 80 is surrounded by a hub or sleeve 92 which is in turn journaled in a bearing 94 on the left-hand flange 88 and which forms a component part of the left-hand end element 68. The bearing 94 includes a bushing 96 surrounding the sleeve or hub 92. Thus, the drum is carried for rotation about the common axis of the coaxial shafts 78 and 80, these shafts being held against rotation and the right-hand end element 66 being journaled on the right-hand short shaft 78 by means of a central hub 98 having a bearing or bushing 100.

Within the drum structure is an elongated control shaft 102 having its opposite ends respectively proximate to and eccentric with respect to the terminal inner end of the supporting shafts 78 and 80. As will be best seen in Figure 3, the control shaft 102 is offset forwardly and downwardly relative to the common axis of the shafts 78 and 80. Means is provided at each of the opposite ends of the control shaft 102 for securing the control shaft to the supporting shafts. At one end, this means takes the form of a casting 104 having opposite end portions respectively receiving the inner end of the shaft 78 and the proximate end of the shaft 102, securing pins 106 and 108 being utilized for the purpose of fixing the casting to the two shafts. A similar casting 110 is provided at the other end of the control shaft 102 for securing that end of the control shaft to the terminal inner end of the shaft 80. Fixed mounting of the castings on the two shaft portions is accomplished by a pair of pins 112 and 114.

The control shaft carries a plurality of bearing elements fixed thereto in axially spaced relation therealong. There are preferably several (four to eight) of these elements, but only two are illustrated in the drawings at 116 and 118. These two elements are fixed to the shaft 102 against both axial and angular movement by a pair of cross pins 120 and 122, respectively, the shaft 102 being appropriately diametrically drilled for the purpose. Although other bearing elements have been omitted from the illustration in Figure 4, the positions thereof will be apparent from the location of a pair of diametrically drilled bores 124 and 126.

The bearing element 116 is provided with a pair of adjacent cylindrical bearing-mounting surfaces 128 and 130 spaced axially of and surrounding the control shaft but respectively formed about axes angled to the control shaft axis. In the embodiment of the invention shown in Figure 4, the axes of the cylindrical bearing-mounting surfaces 128 and 130 are parallel to each other and have the same angular relationship to the axis of the control shaft 102. The bearing-mounting surface 128 provides means for the mounting of an inner end of a crop-engaging finger element 132. The inner end of this finger element includes an appropriate hub or mounting portion 134 fitted with an anti-friction bearing 136, which provides a circular bearing, although the particular type of bearing is broadly immaterial, since the hub 134 could be journaled directly on the surface 128 by a plain bearing, for example. The finger element 132 lies in a plane normal to the axis of the bearing-mounting surface 128 and projects generally radially outwardly through one of the lengthwise slits 76 (the uppermost slit in Figure 4). The adjacent cylindrical bearing-mounting surface 130 carries an anti-friction bearing 138 which serves to mount a hub 140 of a second and similar crop-engaging finger element 142. This finger element likewise lies in a plane normal to the axis of the bearing-mounting surface 130, but this element projects radially outwardly through the slit 76 that is diametrically opposed to the slit 76 through which the finger element 132 projects. The finger elements 132 and 142 are thus angularly phased on the order of 180°. Each finger element projects generally radially outwardly beyond the peripheral wall formed by the assembled arcuate drum sections 64. As the drum is rotated and the shaft 102 is held stationary, the finger elements will rotate about their respective cylindrical bearing surfaces and will be successively extended and retracted through their cooperating slits 76 relative to the peripheral wall of the drum structure. The direction of rotation of the spreader structure is indicated by the arrow E in Figures 1 and 3.

As the spreader structure rotates, the finger elements 132 and 142, in adidtion to being extended and retracted, will be oscillated or shifted back and forth lengthwise of the drum as indicated by the arrow F in Figure 4. This oscillation results because of the angularity of the axes of the cylindrical surfaces 128 and 130 relative to the fixed axis of the control shaft 102.

Rotation of the spreader is accomplished by means of a relatively large sheave 144 keyed to the hub 92 outside the left-hand side sheet 16. This sheave is driven by a crossed endless belt 146 trained about the sheave 144 and about the sheave 50 and an idler sheave 148. The sheave 50, as previously described, is keyed to the outer end of the upper shaft 48 for the feeder 36. This sheave has a double groove to accommodate the belt 146 as well as the belt 54 previously referred to.

The adjacent bearing element 118 on the control shaft 102 has a pair of adjacent cylindrical bearing-mounting surfaces 150 and 152 similar to but 90° out of phase relative to the cylindrical bearing-mounting surfaces 128 and 130 on the bearing element 116. The bearing-mounting surfaces 150 and 152 are provided respectively with anti-friction bearings 154 and 156 and these respectively journal hubs 158 and 160 for third and fourth crop-engaging fingers 162 and 164. These finger elements project radially outwardly respectively through diametrically opposed slits 76 90° out of phase with respect to the slits 76 through which the finger elements 132 and 142 extend. Hence, the fingers 132, 142, 162 and 164 are angularly spaced 90° apart generally about the axis of the control shaft 102. Additionally, these fingers will incline alternately in opposite directions. This relationship of the fingers may best be observed in Figures 1, 3 and 4. However, in comparing Figures 1, 3 and 4, attention is directed to the fact that the spreader 62 in Figure 1 is rotated 90° forwardly relative to the position of the spreader in Figures 3 and 4.

It will be noted that in Figure 4 an intermediate portion of the spreader sturcture 62 has been omitted to shorten the over-all length of the drawing merely for the purposes of convenience to allow the drawing to be made on a larger scale. It will be understood that there are axially spaced along the shaft 102 eight diametrically drilled holes such as those at 124 and 126, so that the drum 62 will have the appearance of that in Figure 1 wherein it will be seen that the spreader has a total of sixteen crop-engaging fingers arranged alternately 90° out of phase. It will be further appreciated that the number of bearing elements, such as 116 or 118, may be reduced or increased, and that the bearing arrangement may be arranged on the shaft 102 in various manners other than that illustrated.

For the purposes of the present explanation, it is to be assumed that a second pair of bearing elements duplicating the bearing elements 116 and 118 will be provided on the shaft 102 and respectively arranged like the bearing elements 116 and 118. Hence, the drum structure will have a plurality of fingers extending therefrom in angularly spaced relation. Since the centers or mounting axes of the fingers are offset relative to the axis of the shafts 78 and 80, the fingers will be successively extended and retracted as the drum 62 is rotated; further, since the axes of the bearing surfaces on which the fingers are mounted are non-parallel relative to the axis of the control shaft 102, the fingers will move back and forth lengthwise of the drum simultaneously with their extension and retraction.

As best seen in Figures 1 and 3, the spreader 62 operates directly above the upper run of the feeder 36 and rearwardly of the pick-up mechanism belts 32. As the grain is picked up from a windrow and delivered rearwardly by the pick-up belts 32 to the feeder 36 to move upwardly on the feeder, the crop-engaging fingers of the spreader 62 will engage this grain and tear the windrow apart so that the windrow is distributed transversely across the width of the feeder 36. This result follows because the oscillation of the fingers (arrow F) is in opposite directions transverse to the direction of feeding, whereby the relatively thick and narrow windrow is spread to a relatively thin and wider stream for more efficient feeding to the thresher cylinder.

In the modified form of the invention shown in Figure 5, the principles of the invention as discussed above are carried out in a different manner. In this instance, there are a plurality of bearing elements only two of which are illustrated and designated by the numerals 166 and 168. The bearing element 166 is pinned to the shaft 102 by a cross pin 170 and has a pair of adjacent cylindrical bearing-mounting surfaces 172 and 174. Although the axes of these surfaces are at the same acute angle relative to the axis of the control shaft 102, the axes are convergent, rather than parallel as in Figure 4. The surface 172 carries an anti-friction bearing 176 on which is journaled a hub 178 of a crop-engaging finger 180. An anti-friction bearing 182 is carried on the other surface 174 to journal a hub 184 of a second crop-engaging finger 186. These fingers extend respectively in opposite directions to project through diametrically opposed slits 76, it being assumed that the bearing elements now described may be utilized in the structure in Figure 4 in substitution for the bearing elements shown in that figure.

The second bearing element 163 is arranged 90° out of phase relative to the bearing element 166 and in this respect may be said to correspond in relative position to the bearing element 118 of Figure 4. The crop-engaging fingers on the bearing element 166 will project in diametrically opposite directions for projection or extension through diametrically opposite slits in the drum, the second pair of diametrically opposed slits being, of course, at 90° to the pair of diametrically opposed slits through which the fingers 180 and 186 extend. However, an arrangement may be used in which adjacent bearing elements are 180° out of phase, the fingers projecting in diametrically opposite directions and only one pair of slits 76 used.

The selection of which type and how many of the bearing elements to utilize depends upon the aggressiveness desired in the agitation and spreading of the windrow across the conveyor 36. Another factor affecting the agitation and spreading functions is speed of rotation of the drum. With a greater number of fingers, the speed of rotation may be reduced.

It will be further understood from the foregoing that the drum may have only a single pair of diametrically opposed slits and that the bearing elements—whichever type is used—may be arranged on the shaft 102 in such manner as to be 180° out of phase, it being necessary only to take the precaution that finger elements of adjacent bearings do not conflict in the same slits.

The operation of the spreader device and the functional characteristics thereof in either modified form thereof will be apparent from the foregoing description. It will be seen that the spreader can be readily provided as an attachment for combines or harvesters of existing types, since no material modification in the basic machine is required.

Various other features and objects of the invention not specifically enumerated above will undoubtedly occur to those versed in the art, as likewise will numerous modifications and alterations in the preferred embodiments of the invention illustrated, all of which may be achieved without departing from the spirit and scope of the invention as defined in the appended claims.

What is claimed is:

1. A crop-spreading device, comprising: an elongated hollow structure having means providing a peripheral wall formed about a central axis and further having opposite end elements coaxial on said axis, said wall means having a pair of diametrically opposed slits lengthwise thereof; a pair of fixed coaxial supporting shafts passing respectively through and having terminal inner ends respectively inwardly of the end elements for journaling the hollow structure; an elongated control shaft within the hollow structure and eccentric to the axis of the supporting shafts and having opposite end portions respectively adjacent to the inner ends of said supporting shafts; means connecting each end of the control shaft to the proximate inner end of a supporting shaft for fixing the eccentric position of said control shaft; a plurality of bearing elements fixed to the control shaft in axially spaced relation, each bearing element having a circular bearing surface surrounding the control shaft but formed about an axis at an angle to the control shaft axis; and a plurality of finger elements respectively journaled on the bearing element surfaces and projecting outwardly therefrom, each finger element lying in a plane normal to the axis of its bearing surface, and certain of the finger elements projecting outwardly through one of the aforesaid slits and outwardly beyond the peripheral wall means and certain other of the finger elements projecting outwardly through the other slit and outwardly beyond said peripheral wall means.

2. The invention defined in claim 1, further characterized in that: the axes of the bearing surfaces of said bearing elements are at the same angle to the axis of the control shaft.

3. The invention defined in claim 1, further characterized in that: the axes of the bearing surfaces of said bearing elements are at the same angle to the axis of the control shaft and are further parallel to each other.

4. The invention defined in claim 1, further characterized in that: the axes of the bearing surfaces of said bearing elements are at the same angle to the axis of the control shaft and said bearing surfaces are arranged in pairs with the axes of bearing surfaces in each pair converging.

5. A crop-spreading device, comprising: an elongated hollow structure having means providing a peripheral wall formed about a central axis and further having opposite end elements coaxial on said axis, said wall means having a pair of diametrically opposed slits lengthwise thereof; a pair of fixed coaxial supporting shafts passing respectively through and having terminal inner ends respectively inwardly of the end elements for journaling the hollow structure; an elongated control shaft within the hollow structure and eccentric to the axis of the supporting shafts and having opposite end portions respectively adjacent to the inner ends of said supporting shafts; means connecting each end of the control shaft to the proximate inner end of a supporting shaft for fixing the eccentric position of said control shaft; a plurality of bearing elements fixed to the control shaft in axially spaced relation, each bearing element having a pair of adjacent circular bearing surfaces spaced axially of and surrounding the control shaft but respectively formed about axes angled to the control shaft axis; and a plurality of finger elements respectively journaled on the bearing surfaces and projecting outwardly therefrom through the aforesaid slits and outwardly beyond the peripheral wall means, each finger element lying in a plane normal to the axis of its particular bearing surface and certain of the finger elements projecting through one slit and certain through the opposite slit.

6. The invention defined in claim 5, further characterized in that: the finger elements project alternately through opposite slits.

7. The invention defined in claim 5, further characterized in that: the adjacent bearing surfaces of each bearing element have their axes angled to the control shaft axes and parallel to each other.

8. The invention defined in claim 5, further characterized in that: the adjacent bearing surfaces of each bearing element have their axes angled to the control shaft axes and convergent as respects each other.

9. A crop-spreading device, comprising: an elongated hollow structure having means providing a peripheral wall formed about a central axis and further having opposite end elements coaxial on said axis, said wall means having a plurality of lengthwise slits therein spaced circumferentially on the order of 90° apart about the axis of said wall; a pair of fixed coaxial supporting shafts passing respectively through and having terminal inner ends respectively inwardly of the end elements for journaling the hollow structure; an elongated control shaft within the hollow structure and eccentric to the axis of the supporting shafts and having opposite end portions respectively adjacent to the inner ends of said supporting shafts; means connecting each end of the control shaft to the proximate inner end of a supporting shaft for fixing the eccentric position of said control shaft; a plurality of bearing elements fixed to the control shaft in axially spaced relation, each bearing element having a circular bearing surface surrounding the control shaft but formed about an axis at an angle to the control shaft axis; and a plurality of finger elements respectively journaled on the bearing element surfaces and projecting outwardly therefrom, each finger element lying in a plane normal to the axis of its bearing surface, and said finger elements being angularly spaced so that certain of them project through one of the aforesaid slits, others through another slit, still others through a third slit, and still others through the other slit, all projecting outwardly beyond the peripheral wall means.

10. The invention defined in claim 9, further characterized in that: each bearing element has a pair of adjacent bearing surfaces whose axes are parallel to each other; the finger elements on said adjacent surfaces project respectively in opposite directions and respectively through one pair of diametrically opposed slits; the adjacent bearing element is positioned on the control shaft in an angular phase of 90° relative to said first named bearing element; and the finger elements on said second named bearing element project respectively in opposite directions and respectively outwardly through the other pair of diametrically opposed slits.

11. The invention defined in claim 9, further characterized in that: each bearing element has a pair of adjacent bearing surfaces whose axes are convergent relative to each other; the finger elements on said adjacent surfaces project respectively in opposite directions and respectively through one pair of diametrically opposed slits; the adjacent bearing element is positioned on the control shaft in an angular phase of 90° relative to said first named bearing element; and the finger elements on said second named bearing element project respectively in opposite directions and respectively outwardly through the other pair of diametrically opposed slits.

12. A crop-spreading device, comprising: an elongated hollow rotatable element having means providing a peripheral outer structure formed about the rotating axis and further having a coaxial supporting means to which said outer structure is secured, said outer structure having a plurality of slits running lengthwise thereof and spaced circumferentially thereabout; a supporting shaft passing axially through and carrying the supporting means and having an inner end portion axially inwardly of said supporting means for journaling the rotatable element; a control shaft within the rotatable element and eccentric to the axis of the supporting shaft and having an end portion adjacent to the inner end of said supporting shaft; means connecting said end of the control shaft to said inner end of the supporting shaft for fixing the eccentric position of said control shaft; a plurality of bearing elements fixed to the control shaft in axially spaced relation, each bearing element having a circular bearing surface surrounding the control shaft but formed about an axis at an angle to the control shaft axis; and a plurality of finger elements respectively journaled on the bearing element surfaces and projecting outwardly therefrom, each finger element lying in a plane normal to the axis of its bearing surface, and certain of the finger elements projecting outwardly through one of the aforesaid slits and outwardly beyond the outer structure and certain other of the finger elements projecting outwardly through other slits and outwardly beyond said outer structure.

RALPH L. ANDERSON.

No references cited.